United States Patent [19]
Lueben

[11] 3,735,913
[45] May 29, 1973

[54] VENTED POULTRY CONTAINER

[75] Inventor: Robert Q. Lueben, Detroit Lakes, Minn.

[73] Assignee: Swift & Company, Chicago, Ill.

[22] Filed: Apr. 26, 1971

[21] Appl. No.: 137,539

[52] U.S. Cl............229/6 R, 229/DIG. 14, 206/46 F
[51] Int. Cl. ..............................................B65d 25/00
[58] Field of Search ......................229/6 R, DIG. 14, 229/40, 36, 16 C, 51 TS; 206/46

[56] References Cited

UNITED STATES PATENTS

| | | | |
|---|---|---|---|
| 2,315,624 | 4/1943 | Kieckhefer | 229/6 R |
| 2,106,908 | 2/1938 | Brunt et al. | 229/6 A |
| 2,133,021 | 10/1938 | Ferguson | 229/6 R X |
| 2,442,161 | 5/1948 | Bergstein | 229/DIG. 14 |
| 3,028,952 | 4/1962 | Milo et al. | 206/46 |
| 3,186,545 | 6/1965 | Conrades | 229/40 X |
| 3,207,414 | 9/1965 | Locke et al. | 229/36 |
| 2,901,156 | 8/1959 | Vines | 229/16 C |
| 3,411,697 | 11/1968 | Hightower et al. | 229/51 TS |

*Primary Examiner*—Davis T. Moorhead
*Attorney*—Edward T. McCabe, Charles E. Bouton, Ben C. Cadenhead and W. C. Davis

[57] ABSTRACT

An improved container, adapted for packaging food items to be subsequently subjected to a blast freezing operation, is provided with spaced venting means in at least two side wall members. The venting means of each side wall member are arranged in a manner so as to direct and enhance the movement of a current of chilled air, flowing towards either end of the container, inwardly one side and outwardly the opposite side of the container is a single direction to provide increased air flow for rapid chilling of the packaged food item therein.

6 Claims, 3 Drawing Figures

Patented May 29, 1973  3,735,913

INVENTOR
ROBERT Q. LUEBEN
BY E. T. McCabe
ATTORNEY

VENTED POULTRY CONTAINER

This invention relates to the container art and more particularly pertains to an improved container for packaging food items which are to be subsequently subjected to a blast freezing operation.

The packing and storing of frozen food products in containers or boxes is well known and has been practiced for some time. Due to the configurations of various food items, particularly poultry carcasses, it has been found most convenient to pack them into containers after or during processing. The containerized products are then easier to handle, store, ship, etc. in view of the uniform configuration of the containers. In addition, products packed in containers are less susceptible to damage, deterioration and pilferage.

However, the use of prior art containers or boxes present certain disadvantages and inconveniences in modern automatic or production line preparation of frozen food products, particularly frozen meat items. The containers generally utilized for packing frozen meat items are usually constructed of heavy-duty corrugated paperboard which tends to act as insulation for the frozen products packed therein particularly when the containers are sealed. This is most helpful during storage and distribution, but, if food products are packed and sealed into the containers prior to being subjected to the freezing operation, the insulation characteristics of the container tend to hinder efficient freezing of the products and increases production time. Hence, it is the generally accepted procedure to freeze food items, particularly meat items, before packing them into a container or box. This prior freezing then involves the disadvantages of requiring careful handling of the frozen products to prevent damage, and results in a freeze loss due to the time required for the packing of the frozen items into containers. Alternatively, the procedure necessitates packing of the frozen items in a low temperature atmosphere which is a discomfort to plant personnel.

Thus it is an object of the present invention to provide a container suitable for packaging food items prior to being subjected to a freezing operation that is designed to reduce the time required to freeze the food items to the proper temperature.

In addition, it is an object of the present invention to provide a container having a reduced bulk and weight which has venting means in at least two opposing side walls thereof, arranged in a manner so as to provide a continual air flow through the container to enhance rapid freezing of food items packaged therein.

It is a further object of this invention to provide a container suitable for packaging food items prior to freezing which has a plurality of vent flaps hingedly connected to the side walls, the vent flaps being arranged in such a manner to direct and enhance the movement of a chilled air current, flowing towards either end of the container, through the container interior in a single direction to promote rapid freezing of the packaged food item.

It is still a further object of the invention to provide an integral cut and scored blank which can be erected into a rectangular container having at least two side walls which are provided with spaced cut and crimped score lines to define a plurality of vent flaps, the vent flaps of each side wall, when angled outwardly from the interior of the container, facing opposite ends of the container so as to direct and enhance the movement of a chilled air current, flowing towards either end, rapidly through the container interior in a singular direction.

Generally, the present invention relates to an improved container having panels to define side and end wall members connected along respective edges and having at least two opposing side walls provided with venting means for directing a current of chilled air, flowing towards one end wall member, through the interior of the container in a singular direction. Also, a top member and bottom member are provided which are connected or secured to the respective end and side wall members. Preferably, the venting means are defined by vent flap members hingedly connected to the respective opposing side wall members which can be angled outwardly to provide vented openings to the interior of the container. The vent flap members of each opposing side wall are arranged to face directions opposite each other, respectively. That is to say, the hingedly connected vent flap members of each opposing side wall face an opposite direction in relation to the vent flap members of the opposite side wall. In accordance with this arrangement the vent flap members tend to act as louvers and can direct a current of chilled air, flowing towards either end of the container inwardly into the interior of the container through the vented openings of only one side and outwardly through the vented openings of only the opposite side.

Additional objects and advantages, if not specifically set forth herein, will be readily apparent to one skilled in the art from the following description.

For a fuller understanding of the nature and objects of the invention, reference is made to the following detailed description, in connection with the accompanying drawings in which.

Figure 1:
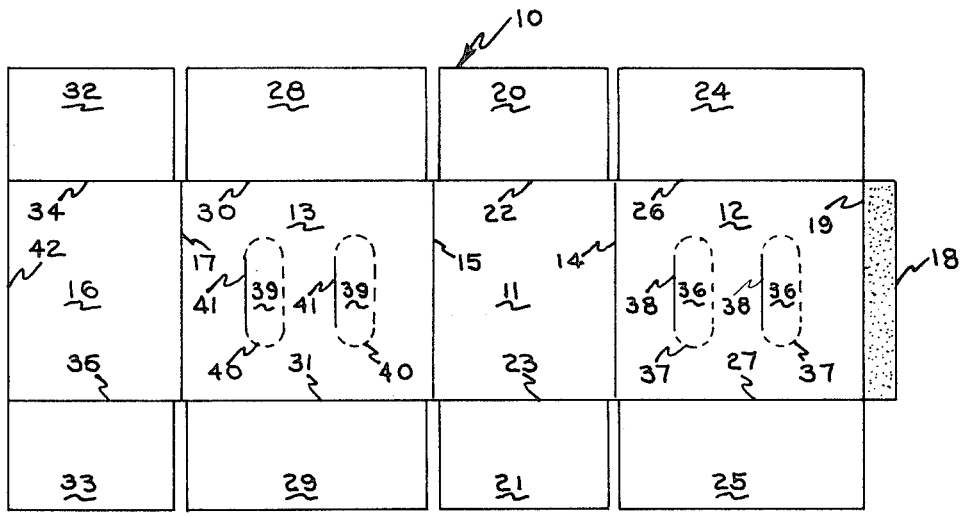
FIG. 1 is a plan view of an integral blank cut and scored for assembling a container according to the present invention.

The improved container of the instant invention can be constructed from any suitable material generally utilized, such as corrugated paperboard, plastic, etc. In addition the container can be formed by molding, such as injection molding, or by the erection of an integral blank. Preferably, the container is formed by the erection of an integral blank of light weight and low bulk corrugated paperboard which is cut and scored, as illustrated in the drawings. Cut and scored integral blanks require less storage space prior to use and can be quickly and easily assembled either by an operator or automatic apparatus.

Referring to the drawings, wherein the same numbers are used to refer to corresponding parts throughout, the outer surface of an integral blank generally 10 is depicted in FIG. 1 as comprising a front end wall panel 11 having side walls 12 and 13 hingedly connected thereto along score lines 14 and 15 respectively. A rear end wall panel 16 is hingedly connected to side wall 13 along score line 17 and a securing flap 18 is hingedly attached to side wall 12 along score line 19.

The front end wall panel 11 is provided at its top and bottom with top front end wall flap 20 and bottom front end wall flap 21 hingedly connected thereto along score lines 22 and 23 respectively. The side wall panel 12 is provided with top side wall flap 24 and bottom side wall flap 25, hingedly connected thereto along respective score lines 26 and 27. In addition, side wall panel 13 is provided with top side wall flap 28 and bottom side wall flap 29 which are hingedly connected thereto along score lines 30 and 31 respectively. Furthermore, rear end wall panel 16 has top rear end wall flap 32 and bottom rear end wall flap 33 hingedly connected thereto along the respective score lines 34 and 35.

The side wall panel 12 is provided with a plurality of spaced vent flaps 36 (of which only two are shown). The vent flaps 36 are defined by spaced cut score lines 37 and crimped score lines 38, respectively. Crimped score lines 38 hingedly connect the vent flaps 36 to the side wall panel 12 when the vent flaps 36 are punched out along spaced cut score lines 37. In addition, side wall panel 13 is provided with vent flaps 39 (of which only two are shown), and are defined by spaced cut score lines 40 and crimped score lines 41. It is pointed out that the vent flaps 39 of side wall panel 13 and vent flaps 36 of side wall panel 12 are identically defined in the same direction and plane as illustrated in FIG. 1. Thus, when the integral blank, generally 10, is assembled and all vent flaps 36 and 39 are punched outwardly from the interior, vent flaps 39 of side wall panel 13 face a direction opposite that of vent flaps 36 of side wall panel 12, as shown in FIG. 2.

The particular size and number of vent flaps 36 and 39 are not critical, so long as sufficient openings of adequate size are provided in each side wall to provide adequate direction and enhanced movement of air currents inwardly and outwardly through the container interior, and there is adequate strength remaining in the side wall members 12 and 13. In addition, the vent flaps 36 and 39 can be defined in any desired shape, such as semi-circular, semi-triangular, semi-rectangular, semi-elliptical, etc. Furthermore, the vent flaps can be juxtaposed in any desired spaced configuration in relation to each other on each respective side wall member 12 and 13. That is to say, the vent flaps can be arranged perpendicularly, diagonally, in parallel, in seriatim, etc. respectively to each other lengthwise or widthwise on each side wall member. As shown in FIGS. 1 and 2, it is preferred to provide each side wall with at least 2 vent flaps in a parallel configuration along the longitudinal line of respective the side walls.

Figures 2, 3:
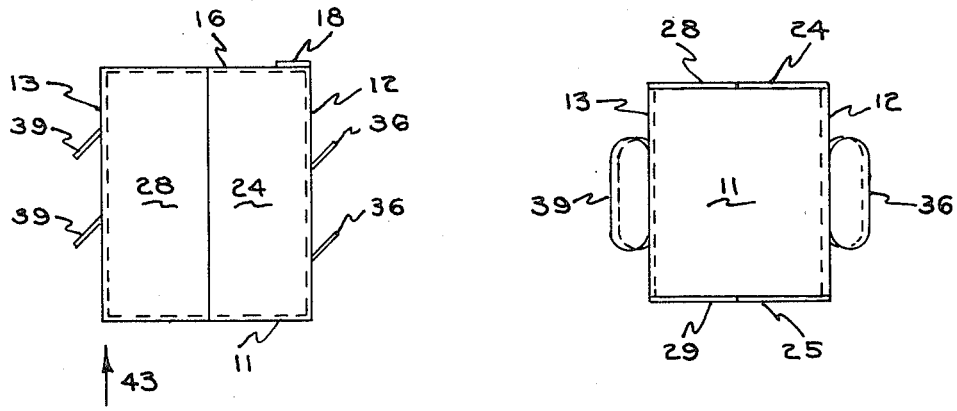
FIG. 2 is a top perspective view showing the vent flap members of at least two opposing side walls angled outwardly and facing directions opposite each other towards opposite ends of the container and acting as louvers to direct the flow of an air current inwardly one side and outwardly the opposite side.
FIG. 3 is an end elevational view of a preferred embodiment of the invention.

Reference is now made to FIG. 2 for purposes of describing the assembled container of the present invention. During assembly, the integral blank, generally 10, is folded along score lines 14, 15, 17, and 19 and rear end wall panel 16 is secured to securing flap 18 along edge 42. The securing means may comprise any of those well known in the art such as adhesive bonding, stapling, stitching, etc. The bottom end wall and side wall flaps 21, 25, 29 and 33 are folded inwardly and secured to each other by any of the securing means described above. The top side and end wall flaps 20, 24, 28 and 32 are folded inwardly, after a food item to be packed and subsequently frozen, is placed inside the container and are also secured to each other. Preferably, prior to securing the top side and end wall flaps to each other and to the addition of the item to be packaged, vent flaps 36 and 39 are punched outwardly to provide vented openings in side wall panels 12 and 13. As shown in FIG. 2, vent flaps 36 open to face a direction opposite that of vent flaps 39 so as to provide a single direction for the air flow 43 (arrows) through the interior of the container from one side and out the opposite side. It is preferred that the vent flaps 36 and 39 be angled outwardly no more than 90° from each side wall member 12 and 13 and that the vent flaps 36 and 39 be hingedly connected to respective side wall members 12 and 13 parallel to the rear end and front end wall members so as to provide proper angulation for inward and outward direction of the air currents.

The direction of air flow 43 through the container in a singular direction by the vent flap members 36 and 39 provides rapid movement of the chilled air through the container so as to rapidly freeze food items packed therein. In addition, the particular arrangement of the vent flap members 36 and 39 tends to create a vacuum in or alongside the container which apparently enhances the movement of air therethrough, i.e., the arrangement produces a possible venturi effect.

When fully assembled, the container allows a food item to be packaged and sealed prior to being subjected to a freezing operation without any loss of cooling efficiency or time required to freeze the food item. Furthermore, after the containerized food item has been subjected to a blast chill freezing operation for a sufficient period of time to promote freezing, vent flaps 36 and 39 can be closed to prevent entrance of dust, excess moisture, etc. and excessive loss of temperature during subsequent storage and distribution.

Obviously many modifications and variations of the invention as hereinbefore set forth may be made without departing from the spirit and scope thereof, and, therefore, only such limitations should be imposed as are indicated in the appended claims.

I claim:

1. An improved container adapted for packaging and storing food items to be subsequently subjected to a blast freezing operation while sealed in the container, said container comprising: a front end wall member; a first side wall member connected to one edge of said front end wall member, said first side wall member having spaced venting means; a second side wall member connected to an edge of said front end wall member opposite said first side wall member, the second side wall member also being provided with spaced venting means; a rear end wall member connected to the opposite edge of said second side wall member from said front end wall member and also connected by its opposite edge to the opposite edge of said first side wall member; a top member connected to the top edges of said wall members; and a bottom member connected to the bottom edges of said wall members, said venting means of each respective side wall member being defined by a plurality of closable vent flap members hingedly connected to the respective side wall members to provide louvered openings to the interior of said container, the vent flap members of each side wall member being angled outwardly and facing a direction opposite that of the respective vent flap members of the opposite side wall member to direct and enhance the movement of a current of chilled air, flowing towards either end wall member, in a single direction only inwardly one side and outwardly the opposite side of said container to promote rapid freezing of the food item packaged therein.

2. The container of claim 1 wherein said vent flap members are angled outwardly up to 90° and are reclosable to provide insulation and protection of the food item sealed therein, during subsequent storage.

3. The container of claim 1 wherein at least two vent flap members are hingedly connected to each respective side wall member, said vent flap members being arranged in parallel lengthwise of each side wall member.

4. The container of claim 1 wherein said container is formed from a cut and scored integral blank.

5. The container of claim 1 wherein said container is constructed of corrugated paperboard.

6. An integral blank for forming a container adapted for packaging food items prior to being subjected to a blast chill freezing operation, said integral blank being cut and scored, comprising: a front end wall member; a side wall member hingedly connected to one edge of said front end wall member, the side wall member having spaced cut and crimped score lines to define a plurality of vent flap members hingedly connected to said side wall member; a second side wall member hingedly connected to the opposite edge of said front end wall member, said second side wall member having cut and crimped score lines to define an equal plurality of vent flap members hingedly connected to said second side wall member and being arranged identically in the same plane to said spaced cut and crimped score lines of said first side wall member so that the vent flap members of said second side wall member can be angled outwardly to face a direction opposite that of the angled outwardly vent flap members from said first side wall member when said integral blank is assembled; a rear end wall member hingedly connected to the opposite edge of the second side wall member and being adapted for securing to the opposite edge of said first side wall member; top flaps hingedly connected to the top edges of said wall members; and bottom flaps hingedly connected to the bottom edges of said wall members.

* * * * *